US011882859B2

(12) United States Patent
Blutinger et al.

(10) Patent No.: US 11,882,859 B2
(45) Date of Patent: Jan. 30, 2024

(54) METHOD AND SYSTEMS FOR LASER-BASED COOKING

(71) Applicant: The Trustees of Columbia University in the City of New York, New York, NY (US)

(72) Inventors: Jonathan Blutinger, New York, NY (US); Hod Lipson, New York, NY (US); Yorán Meijers, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 164 days.

(21) Appl. No.: 16/163,727

(22) Filed: Oct. 18, 2018

(65) Prior Publication Data

US 2019/0110505 A1   Apr. 18, 2019

Related U.S. Application Data

(60) Provisional application No. 62/573,765, filed on Oct. 18, 2017.

(51) Int. Cl.
*A23L 5/10* (2016.01)
*A23P 30/20* (2016.01)
*A23P 20/25* (2016.01)

(52) U.S. Cl.
CPC ............ *A23L 5/15* (2016.08); *A23P 30/20* (2016.08); *A23P 2020/253* (2016.08)

(58) Field of Classification Search
CPC ..... B66B 13/146; B66B 13/26; B66B 1/3461; B66B 1/468; B66B 2201/20; B66B 2201/214; B66B 2201/4638; G05B 19/042; G05B 2219/2659; G06T 15/04; G06T 2207/10028; G06T 7/50; A23L 5/15; A23P 2020/253; A23P 30/20
USPC ........................................ 219/121.6
See application file for complete search history.

(56) References Cited

U.S. PATENT DOCUMENTS

| 5,910,264 | A | 6/1999 | Dauliach |
| 5,952,027 | A * | 9/1999 | Singh ............... A23P 20/10 426/103 |
| 6,069,345 | A | 5/2000 | Westerberg |
| 9,107,434 | B2 * | 8/2015 | Singh ................. F24C 7/087 |
| 2008/0282901 | A1 * | 11/2008 | Muchnik ............. A23L 5/15 99/325 |
| 2011/0002677 | A1 | 1/2011 | Cochran et al. |

(Continued)

FOREIGN PATENT DOCUMENTS

WO    2016/053681 A1    4/2016

OTHER PUBLICATIONS

Abdullah et al., "20—Quality Evaluation of Bakery Products," In Computer Vision Technology for Food Quality Evaluation, 2008, pp. 481-522.

(Continued)

*Primary Examiner* — Dana Ross
*Assistant Examiner* — Joseph W Iskra
(74) *Attorney, Agent, or Firm* — BakerHostetler (57) ABSTRACT

An apparatus includes a first laser, a second laser, and a controller. The first and second lasers output different wavelengths of light. The controller controls the first and second lasers so as to cook food.

7 Claims, 4 Drawing Sheets

(56) References Cited

U.S. PATENT DOCUMENTS

2017/0181445 A1* 6/2017 Leach ............... A23G 3/0097
2017/0245682 A1* 8/2017 Gracia ............... B33Y 10/00

OTHER PUBLICATIONS

Barbanti et al., "Influence of Cooking Conditions on Cooking Loss and Tenderness of Raw and Marinated Chicken Breast Meat," LWT—Food Science and Technology, 2005, vol. 38, No. 8, pp. 895-901.

Bircan et al., "Determination of Protein Denaturation of Muscle Foods Using the Dielectric Properties," Journal of Food Science, 2002, vol. 67, No. 1, pp. 202-205.

Burns et al., "Spectroscopic use of a novel blue diode laser in wavelength region around 450nm", Applied Physics B, Sep. 2004, vol. 79, Issue 4, pp. 491-495.

Fukuchi et al., "Laser cooking: a novel culinary technique for dry heating using a laser cutter", Proceedings of the ACM, Nov. 2, 2012.

Hargis et al., "Microbiological Pathogens: Live Poultry Considerations", Poultry Meat Processing, 2000, Chapter 8, pp. 132-146.

Kijowski et al., "Thermal Properties of Proteins in Chicken Broiler Tissues," Journal of Food Science, 1988, vol. 53, No. 2, pp. 363-366, http://doi.wiley.com/10.1111/j.1365-2621.1988.tb07706.x (Jun. 22, 2017).

Krishnamurthy et al., "Infrared heating in food processing: an overview", Comprehensive Reviews in Food Science and Food Safety, Jan. 2008, vol. 7, Issue 1, pp. 2-13.

Lonergan et al., "Breast Meat Quality and Composition in Unique Chicken Populations," Poultry Science, 2003, 82(12), pp. 1990-1994.

Opes et al., "Structural Changes in the Dough During the Pre-Baking and Re-Baking of French Bread Made with Whole Wheat Flour," Food and Bioprocess Technology, 2013, vol. 6, No. 10, pp. 2808-2819.

Mizrahi et al., "Digital gastronomy: methods & recipes for hybrid cooking", Proceedings of the 29th Annual Symposium on User Interface Software and Technology, Oct. 2016, 12 pages.

Mondal et al., "Bread Baking—A Review,", Journal of Food Engineering, 2008, vol. 86, No. 4, pp. 465-474.

Murphy et al., "Apparent Specific Heat of Chicken Breast Patties and Their Constituent Proteins by Differential Scanning Calorimetry," Journal of Food Science, 1998, vol. 63, No. 1, pp. 88-91.

Olkku et al., "Gelatinisation of Starch and Wheat Flour starch—A Review," Food Chemistry, 1978, vol. 3, No. 4, pp. 293-317.

Purlis et al., "Modelling the Browning of Bread during Baking," Food Research International, 2009, vol. 42, No. 7, pp. 865-870.

Purlis, "Baking Process Design," In Handbook of Food Process Design, Oxford, UK: Wiley-Blackwell, 2012, 743-68.

Siripon et al., "Heat Transfer Modeling of Chicken Cooking in Hot Water," Food Research International, 2007, vol. 40, No. 7, pp. 923-930.

USDA FSIS. 2004. "Ground Poultry and Food Safety," https://www.fsis.usda.gov/wps/portal/fsis/topics/food-safety-education/get-answers/food-safety-fact-sheets/poultry-preparation/ground-poultry-and-food-safety/CT_Index (Jun. 22, 2017).

Wang et al., "Molecular Disassembly of Starch Granules during Gelatinization and Its Effect on Starch Digestibility: A Review," Food & Function, 2013, vol. 4, No. 11, p. 1564.

Zanoni et al., "A Naive Model of Starch Gelatinization Kinetics, "Journal of Food Engineering, 1995, vol. 24, No. 1, pp. 25-33.

Zanoni et al., "Modelling of Browning Kinetics of Bread Crust during Baking," LWT—Food Science and Technology, 1995, vol. 28, No. 6, pp. 604-609.

Zoran et al., "Cornucopia: the concept of digital gastronomy", Leonardo, Oct. 2011, vol. 44, Issue 5, pp. 425-431.

\* cited by examiner

METHOD AND SYSTEMS FOR LASER-BASED COOKING

RELATED APPLICATIONS

This application claims the benefit of the Oct. 18, 2017 priority date of U.S. Provisional Application 62/573,765, the contents of which are herein incorporated by reference.

FIELD OF INVENTION

The invention relates to food preparation, and in particular, the use of laser radiation for cooking.

BACKGROUND

The development of three-dimensional printing has made it possible to print various solid structures on-demand by feeding an appropriate "ink" into the printer. For example, it is possible to print various plastic structures by providing the printer with an appropriate plastic as the "ink."

In some cases, it is possible to provide the printer with edible material that can then be used to form various food structures. In some cases, it is possible to layer these food structures on top of each other to create a composite food product. This technology is often referred to as "food layered manufacture."

However, a difficulty that arises with food is that sometimes it must be cooked. Conventional methods of cooking do not always work well with thin layers of food.

SUMMARY

Disclosed herein are systems, methods, devices, and other implementations that include an apparatus that comprises a first laser, a second laser, and a controller, wherein the first and second lasers output different wavelengths of electromagnetic radiation, and wherein the controller controls said first and second lasers so as to cook food.

A three-dimensional printer permits creation of edible three-dimensional structures of great complexity. For example, it would, in principle, be possible to "print" an edible frigate-cake complete with edible flags flying from its masts.

Some embodiments also include a printer. These embodiments would include a food source for providing the food and a nozzle through which food passes during the printing process. In these embodiments, the first and second lasers are directed to illuminate the food as it emerges from the nozzle to form an edible structure. As a result of this illumination, the energy delivered by the laser interacts with the food to cause such effects as heating, cooking, and browning.

A difficulty that arises is that different parts of the edible structure may have to be cooked in different ways. For example, in the case of an edible frigate, the spars may be quite thin whereas the hull may be quite thick. If one were to expose them to the same cooking environment, it is likely that one would be underdone or overdone.

In some cases, different parts of the structure may be made of different materials.

For example, if the edible structure is a scale model of a cathedral the food used to form the stained-glass windows would likely be some translucent colored candy, whereas the stone walls and flying buttresses would likely be printed using a dough of some kind. These regions would have very different cooking properties.

In some embodiments, the edible material may be cooked more or less immediately after it is applied. For example, when the edible material is a dough of some kind, the dough will not be self-supporting when raw. As such, it will tend to flow downwards under gravity's influence. Thus, if one were to attempt to build a frigate out of dough, the dough used to form various vertical members such as masts and sails would immediately start to flow downwards under the influence of gravity.

Therefore, in order to build interesting edible-structures it may be necessary to cook the food almost immediately as it is applied. Naturally, one cannot place the food in the oven as it is being printed into being. However, a laser offers a solution.

Unlike conventional cooking methods, which tend to cook all the food more or less at once, a laser offers considerably higher resolution. As a result, a laser is able to target small regions of the food. This makes it possible to cook the food as it is being printed. As a food-printer outputs a small portion of an edible structure, a laser can be focused on that small portion to immediately cook it. This type of inline cooking promotes structural stability and makes it possible to print more interesting edible structures.

Another advantage of targeting small regions of food for cooking is that different regions of a printed edible structure may be made of different foods with different cooking properties. Sometimes, these regions may be very close together. For example, in the case of the scale model of a cathedral, the translucent edible material used to make the stained glass will be adjacent to the material used to make the walls.

An advantage of cooking with a laser in this context is that a laser can be easily controlled to illuminate a succession of small regions. As a result, it is possible to modulate the laser as it cooks different regions of the food structure. This means, for example, that one can point the laser at the stained-glass portion of the structure and modulate it to cook the edible window-material, and then immediately shift the beam over to the wall portion and modulate it to cook the edible wall-material.

In one aspect, the invention includes an apparatus having a first laser, a second laser, and a controller. The first and second lasers emit visible and infrared light respectively. The controller causes the first and second lasers to trace corresponding patterns on a food substance.

Some embodiments include a printer having a source for providing the food substance and a nozzle. The first and second lasers are directed to cook the food substance as the food substance emerges from the nozzle to form an edible structure.

Embodiments include those in which the controller is configured to cause the first and second laser to trace corresponding patterns on a target region of the food substance, either concurrently, serially, or at overlapping times.

Embodiments include those in which the controller causes the lasers to trace out particular patterns on the food substance. Among these are controllers that trace out spiral patterns, including those that trace out Archimedean spirals. Also among these are embodiments that trace a Hilbert curve, those that trace a ring, and those that trace a trochoid.

Further embodiments include those in which the first laser emits violet light, those in which it emits light having a wavelength of 405 nanometers, those in which it emits light having a wavelength of 445 nanometers, those in which it emits light having a wavelength of 455 nanometers, those in which it emits light having a wavelength of 450 nanometers, and those in which it emits light having a wavelength of wavelength between 450 nanometers and 495 nanometers. In yet other embodiments, the first laser is a semiconductor diode laser, such as a laser that relies on a combination of indium, gallium, and arsenic for emission of light.

Also among the embodiments are those in which the second laser emits light having a wavelength of between 900 nanometers and 1100 nanometers. Among these embodiments are CO2 lasers. Also among these are lasers that emit light at 980 nanometers and lasers that emit light at 10.6 micrometers.

In some embodiments, first and second diverging lenses are placed in front of the respective first and second lasers. In others, a diverging lens is placed in front of only one of the lasers.

In another aspect, the invention features a method comprising providing a food substance, causing a first laser beam to trace out a first scan pattern on a surface of the food substance, causing a second laser beam to trace out a second scan pattern on the food substance. In such a method, first laser beam is in the visible range and the second laser beam is in the infrared range.

Some practices feature causing the first and second laser beams to continue tracing out the first and second scan pattern until the food substance has been transformed from a raw food substance into a cooked food substance.

Other practices include printing an edible structure, with the food substance being a constituent thereof and cooking at least a portion of the edible structure. Among these are practices in which printing includes causing a printer to output food substance from a nozzle thereof to form the edible structure.

Yet other practices include those in which providing a food substance comprises providing first and second layers, each of which comprises food substance. The first and second lasers deposit energy on a surface of the first layer and also on a surface of the second layer. This is followed by manufacturing a food product that comprises at least the first and second layers.

Other practices feature causing the first laser beam to cook the core of the food substance and causing the second laser to brown at least a portion of the food substance. In these embodiments, most of the energy from the first laser penetrates the surface of the food substance whereas most of the energy from the second laser is absorbed at or just below the surface. The resulting bimodal cooking process results in a thoroughly-cooked food substance with an attractively browned surface.

Yet other practices include inhibiting overcooking of the food substance. This can be achieved by controlling at least one of circle diameter and circle density of the scan pattern traced out by the lasers or by controlling repetition of one of the first and second scan patterns.

These and other features of the invention will be apparent from the following detailed description and the accompanying figures, in which:

DETAILED DESCRIPTION

Figure 1:
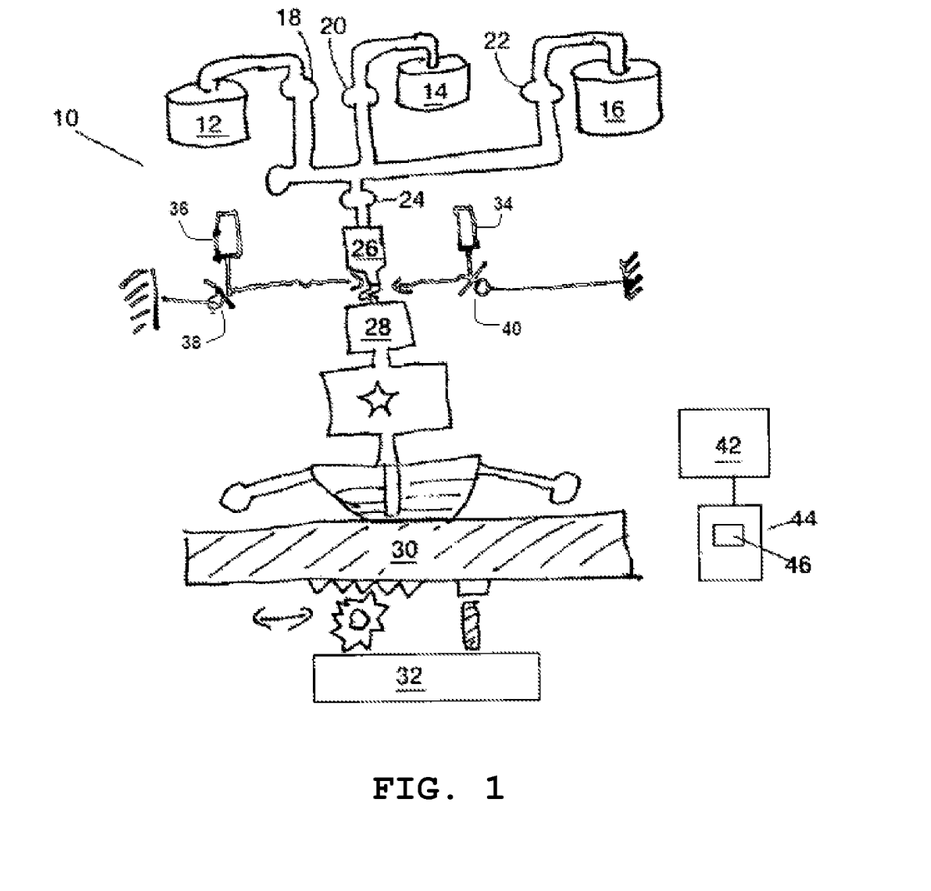
FIG. 1 shows a pair of lasers being used to cook food.

Referring now to FIG. 1, a printer 10 for printing edible structures features ingredient sources 12, 14, 16 and valves 18, 20, 22, 24 for controlling flow of ingredients to a nozzle 26 that prints an edible structure 28 on a stage 30. A motor 32 moves the stage 30 so as to cause relative motion between the stage 30 and the nozzle 26. In some embodiments, the stage 30 is stationary and the nozzle 26 moves.

The printer 10 also includes first and second lasers 34, 36 directed towards first and second motor-driven mirrors 38, 40 that can direct the beam to particular locations in response to instructions provided by a controller 42. The controller 42 also controls the valves 18, 20, 22, 24 to cause the printer 10 to build an edible structure 28 that corresponds to edible-structure data 44 stored in a memory 46.

Figure 2:
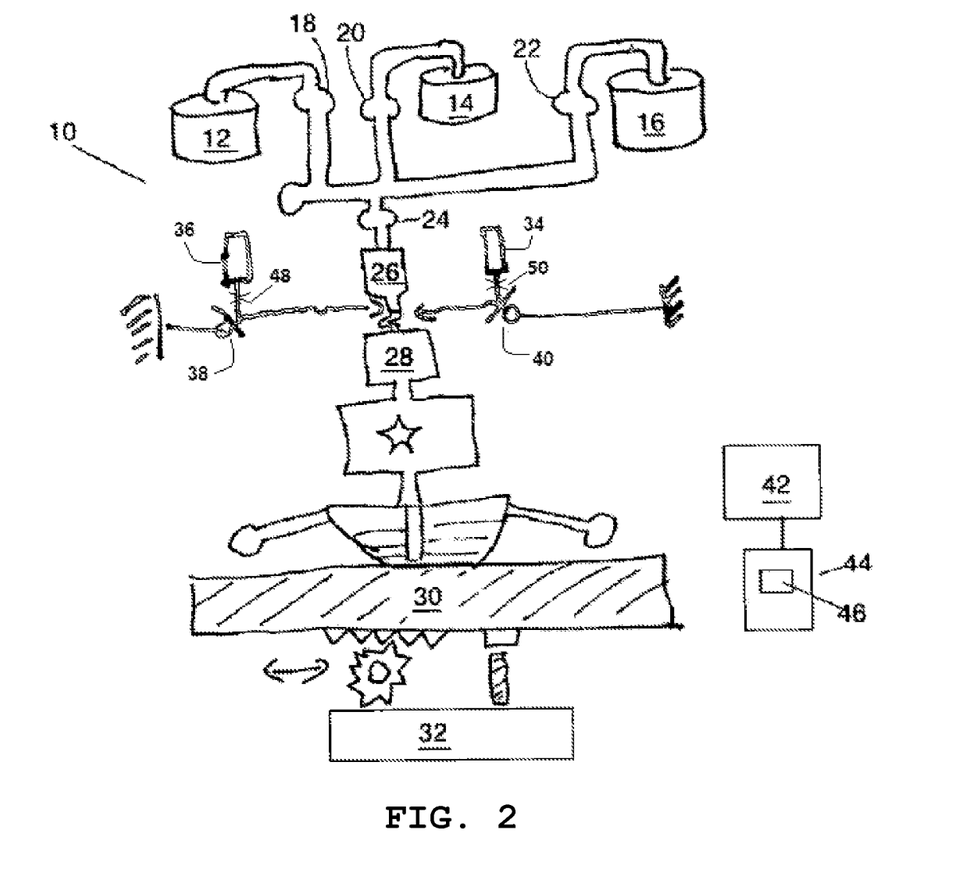
FIG. 2 shows an embodiment similar to that shown in FIG. 1 but with diverging lenses in front of each laser.

In some embodiments, a diverging lens 48, 50 in front of each laser 34, 36 prevents excessively high energy density that may tend to overcook or even burn certain regions of the edible structure.

The first and second lasers 34, 36 output light having different wavelengths. The first laser 34 outputs a wavelength for which the food is relatively transparent. The second laser 36 outputs a wavelength for which the food is relatively opaque.

In one embodiment, the second laser 36 outputs light in the infrared range. A suitable range is between 760 nanometers and 10 micrometers.

In some implementations, the second laser 36 emits light having a 10.6-micrometer wavelength. Light of this wavelength has only limited penetration depth. However, it is highly absorbed by organic materials. In addition, heat generated through interaction of the radiation with the food is transferred very slowly. As a result, lasers of this type are particularly useful for food-layered manufacture and three-dimensional food-printing. In such an application, it is possible to match the height of the printed layer to the penetration depth of the laser radiation. A suitable laser for emitting light of this wavelength is a carbon-dioxide laser.

A 10.6-micrometer wavelength is a particularly good choice for browning foods, particularly high starch foods such as those based on a dough. It is thus useful for browning thin foods for use in food-layered manufacturing. Although such a laser provides only limited heat penetration, it is particularly effective at forming a good crust and browning, particularly when the operation is carried out at low moisture levels and at a temperature of above 110° C.

However, for deeper heat-penetration, a shorter wavelength is preferred. A suitable second laser 36 that promotes deeper heat-penetration is one that emits light having a wavelength of around 980 nanometers. A diode laser that relies on indium, gallium, and arsenic is useful for producing light of this wavelength.

In one embodiment, the first laser 34 outputs 445-nanometer light and the second laser 14 outputs infrared light.

A suitable 445-nanometer laser is a diode-laser that outputs between 3 and 4 watts. Depending on the nature of the food, this output wattage can be higher. However, the actual output may also be lower to avoid overcooking the food or overheating the laser. Such lasers are commonly used in reading and writing data because their short wavelength permits higher information density on the recording medium.

In general, if a laser illuminates a section of the edible structure for too long, the energy flux is high enough so that burning rather than cooking takes place. To avoid this, it is useful to reduce the average energy flux at any one location. This is carried out by having the controller 42 cause a laser 34, 36 to trace out a particular path on the edible structure. The shape of the path avoids excessive heat build-up at any one point by allowing the heat to dissipate via conduction in the material. The nature of the path thus depends at least in part on the heat-conductive properties of the particular edible material. The controller 42 can change the shape of this path on the fly as the laser encounters different materials.

Figure 3:
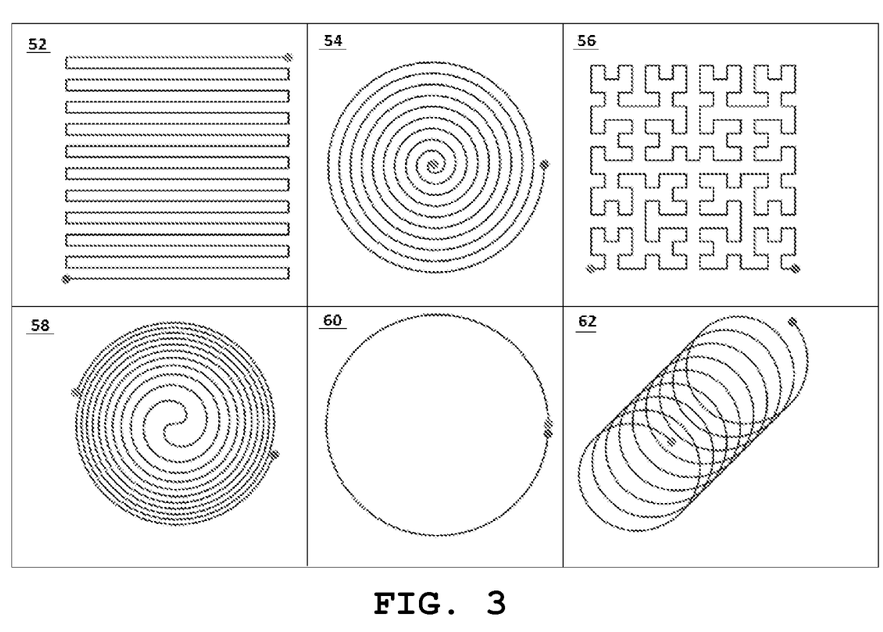
FIG. 3 shows scan patterns used by the lasers in FIG. 1.

FIG. 3, shows first through sixth paths 52, 54, 56, 58, 60. The first path 52 is a rectangular scan raster pattern. The second path 54 is a spiral. The third path 56 is a Hilbert curve. The fourth path 58 is an Archimedean spiral. The fifth path 60 is a ring. The sixth path 62 is trochoid. The dots indicate start and end points for each pattern 52, 54, 56, 58, 60.

The Archimedean spiral shown in the fourth path 58 permits decreased exposure in the central portion of the region being cooked. The interlaced circles shown in the sixth path 62 allow for continuity as well as repeated exposure of the region being cooked. The size and density of the patterns shown has a significant effect on cooking. For example, if the circles are too small in the sixth pattern 62, the food may burn, whereas if they are too large, the food may not cook. In the case of dough, a circle diameter of 3 millimeters has been found to provide satisfactory results.

The use of two wavelengths is particularly desirable because different wavelengths have different cooking properties. The infrared laser is useful for browning. But infrared light has limited penetration depth. The short-wavelength laser is particularly useful because any water present in the edible structure is essentially transparent at this wavelength. This means that the short-wavelength laser is able to more evenly cook the food.

Higher energy photons would also have this property. However, as the wavelengths become shorter, the energy per photon becomes high enough to begin ionizing the food instead of cooking it. As such, the portion of the spectrum that is around 450 nanometers permits the use of penetrating but not ionizing radiation.

Figure 4:
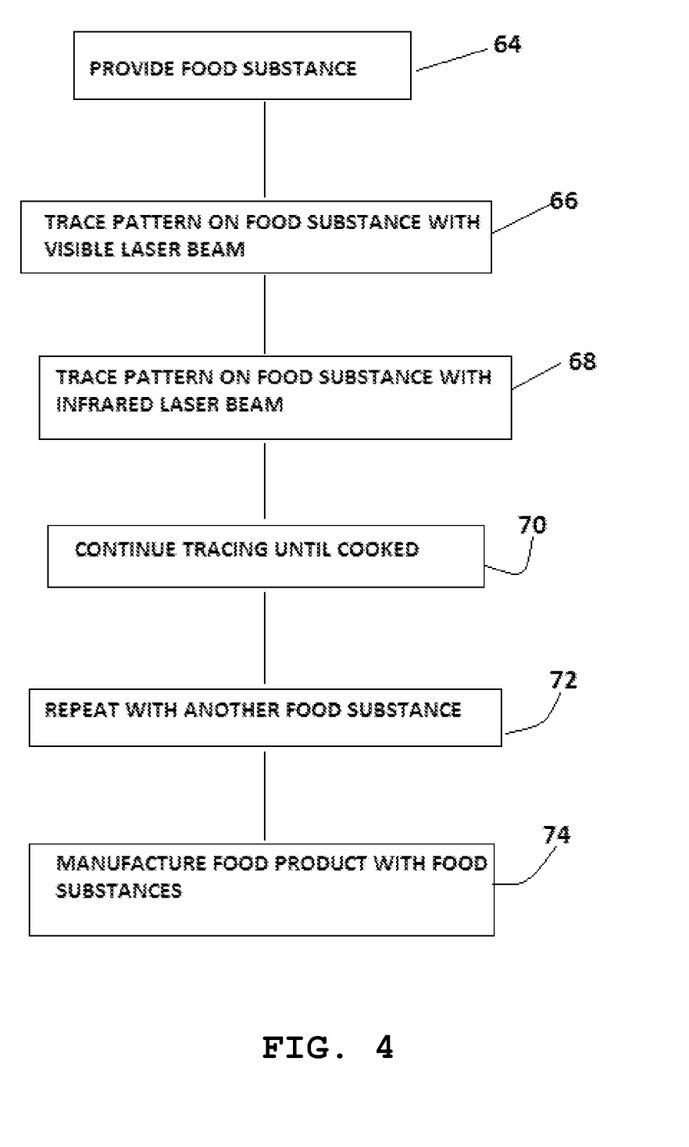
FIG. 4 shows a method for cooking foods using the apparatus shown in FIG. 1 or FIG. 2.

FIG. 4 shows a method that begins with providing food substance (step 64) and continues with tracing a pattern on a food substance with a visible laser beam (step 66) and also with an infrared laser beam (step 68). These steps can be carried out at the same time, in series, or during overlapping times. The tracing continues until the food substance has been cooked (step 70). If necessary, the procedure is repeated with another food substance (step 72). The food substances thus cooked can then be used in connection with manufacturing a food product (step 74). For example, when the provided food substances are comestible layers, the layers can be laid on each other and joined to form a manufactured food.

The extent of browning depends a great deal on the amount of power per unit area, or power flux, that the laser provides.

In one example, a dough was made by mixing 200 grams of all-purpose flour with 120 grams of water for about two minutes in a food processor at a temperature of about 23° C. and allowing the dough to rest for fifteen minutes at a relatively low temperature, for example at 4° C., to slow down any reactions in the dough. The dough was then rolled into thin sheets of about two millimeters and cut into 30-millimeter squares. When exposed to a 10.6-micrometer light with a 5.7-millimeter diameter beam that provides a flux of 0.32 megawatts per square meter, it was possible to achieve a penetration depth on the order of 0.77 millimeters in about 180 seconds.

In one experiment, dough as described above was illuminated with an 8-watt laser for a fixed 45-second exposure time and the power flux made to vary by changing the distance to the surface of the dough. The particular laser focused the beam such that its beam waist was 4.5 millimeters from its output. Divergence beyond the beam waist was determined experimentally by exposing acrylic to the beam, varying the distance to the beam, measuring the extent of the heat damage on the acrylic, and carrying out a linear regression to model the divergence. In the experiment described herein, the beam diameter beyond the waist was found to be linear with a slope of 0.1143 and an intercept on the diameter axis of 0.1804.

As used herein, power flux is the output laser power normalized by the area of the laser beam on the plane at which it intersects the target, which in this case is the surface of the dough. The energy flux delivered while scanning across the dough sample would then be the product of the power flux and the dough sample's area normalized by the product of the gap between scan lines and the velocity of the beam as it traversed the sample. The "point exposure time" would then be the product of the laser beam's area as described above and the exposure time normalized by the sample's area. The spatial variance of energy is determined numerically with an assumption of a Gaussian beam profile.

During the experiment, the beam followed a raster scan pattern in which half the sample was exposed to a second pass of the beam. This made it possible to assess the effect of repeated laser exposure on dough browning.

The experiment revealed that when power flux is excessive, evaporation takes place so rapidly that there is not enough time for the dough to brown. As a result, the dough tends to disintegrate into a powder. For example, with the beam diameter reduced to 1.1 millimeters and exposure times of 36 seconds and 45 seconds, the surface of the dough developed a white powder and no browning occurred. On the other hand, when the energy flux is too low, browning does not occur at all. A suitable power flux for browning dough in the experiment described herein was on the order of 1.1 megawatts per square meter.

On the other hand, with a power flux of 2.03 megawatts per square meter and a three-minute exposure, a great deal of browning occurs. For such a power flux, exposure times of 45, 60, and 90 seconds yielded an attractive degree of browning. A shorter exposure of 36 seconds gave the dough a characteristic lightness associated with early stages of the baking process but without the browning. A similar effect occurred when the sample was heated at a power flux of 0.32 megawatts per square meter for 90 seconds and for samples heated at a power flux of 0.89 megawatts per square meter for 36, 45, and 60 seconds. At this power flux, exposure for 180 seconds resulted in excessive browning with some dough that would normally be beneath the crust become visible as burnt dough on the crust began to clump together.

Optimal browning also occurred when exposing a sample for 90 seconds to a power flux of 0.89 megawatts per square meter. Exposures of samples for 36, 45, and 60 seconds to a power flux of 0.50 megawatts per square meter and 0.32 megawatts per square meter showed negligible differences. These samples appeared slightly darker than raw dough.

The extent of browning is sensitive to changes in power flux. For example, in one experiment, exposing dough for 180 seconds to a power flux of 0.5 megawatts per square meter resulted in considerable browning whereas the same exposure with a flux of 0.32 megawatts per square meter resulted in a more conventional browning.

While optimal sample exposure time and beam flux for browning are limited, these variables can be tuned to achieve various degrees of burning. Satisfactory browning in dough was achieved at a power flux of 0.32 megawatts per square meter and an exposure time of 180 seconds. Other browning procedures that generated favorable browning results included exposures at 45, 60, and 90 seconds to a power flux of 2.03 megawatts per square meter, exposure for 90 seconds to a power flux of 0.89 megawatts per square meter, and exposure for 90 seconds to a power flux of 0.5 megawatts per square meter.

Since power flux depends on both total power and beam diameter, it is also possible to tune the degree of browning by changing the laser's power instead of the beam's diameter while keeping scan speed the same.

A useful method for better understanding the interplay between the various physical parameters, such as energy flux, power flux, point-exposure team, and beam-energy variance, on browning is to carry out a symbolic regression. Such a procedure involves searching a space of operations to find a model that best fits a particular set of data. Such a procedure attempts to model a relationship between the brightness of a laser-baked dough sample and the foregoing variables. The brightness is obtained by measuring a color vector of each of a set of pixels near the center of the sample and obtaining an average value in the relevant color space. In a preferred embodiment, the color space is the hue-saturation-value space.

A symbolic regression of this type will generate many models of which three that have particular usefulness are presented herein, two of which are polynomials while the other includes an exponential term. These are: $V = A1 + B1*E + C1*E*V + D1*V^2 - E1*V - F1*E*V^2$; $V = A2 + B2*E + C2*P*V + D2*E*V + (E2 - F2*P^2 - G2*E - H2*P)*V^2 + (I2 - J2*V)*P^2 - K2*P - L2*V$; $V = A3 + B3*F + C3*E*F - D3*E - E3*F^2 - F3*EXP(G3*E + H3*E^3 - I3 - J3*E^4 - K3*E^2)$ where E represents energy per unit area, V represents spatial variance in energy deposition, F represents power flux, P represents exposure time, V represents the brightness obtained as described above, and the remaining terms are constants that are determined through regression analysis for a given data set.

For samples as described above, and after having normalized data by subtracting the mean of each data set and dividing by its standard deviation, the first model becomes $V = 206.4 + 0.3386*E + 0.3386*E*V + 1.923*10^{24}*V^2 - 4.461*10^{13}*V - 1.09*10^{21}*E*V^2$. The second model becomes $V = 208.5 + 0.3142*E + 4.975*10^2*P*V + 1.167*10^{10}*E*V + 1.96*10^{24}*V^2 + 7.356*P^2 + 2.498*10^{23}*P^2*V^2 - 13.5*P - 4.335*10^{13}*V - 2.711*10^{12}*P^2*V - 1.075*10^{21}*E*V^2 - 4.584*10^{12}*P*V^2$. The third model becomes $200.6 + 34.41*F + 0.07105*E*F - 0.592*E - 4.327*F^2 - 89*exp(0.3053*E + 9.152*10^{-6}*E^3 - 13.94 - 1.253*10^{-8}*E^4 - 2.507*10^{-3}*E^2)$. The somewhat large coefficients arise from a very low variance in the amount of energy applied to the dough.

As is apparent from the different levels of complexity in the foregoing equations, there exists a tradeoff between complexity and accuracy. However, for goodness-of-fit values greater than 0.85, the above relationships reliably approximate brightness. Of particular interest is the ability to estimate the extent of browning using only three physical parameters. This simplifies the task of precisely controlling the amount of browning that can be achieved when using coherent infrared light for browning dough.

Power flux also has the effect of causing the dough to lose weight. For example, when exposed to a flux of 0.89 megawatts per square meter for 45 seconds to a beam moving at 200 millimeters per second, a sample of dough lost 0.055 grams. At a higher power flux of 1.78 megawatts per square meter, a similar sample of dough lost 0.143 grams.

The weight loss of a sample provides a basis for inferring total energy absorbed at the surface.

Also of interest is the relationship of weight loss to beam diameter. Below a threshold exposure times, weight loss is largely independent of beam diameter. However, past this threshold, weight loss increases rapidly with beam diameter. For example, when a sample was exposed for 40 seconds to beams whose diameters varied between 1.1 millimeters and 5.7 millimeters, the spread in weight loss was only about 0.1 grams. In contrast, when the sample was exposed for 180 seconds, the same variation in beam diameter yielded a spread in weight loss of about 0.6 grams.

Heat flux at small beam diameters was high enough to almost completely desiccate the dough before significant conductive heat transfer can occur. As a result, the dough turns into powder instead of browning.

Power flux also has the effect of increasing heat penetration. Heat penetration is measured by asking how far deeply below the surface of the dough one must penetrate to reach a particular threshold temperature. The deeper one must penetrate, the more thoroughly baked the dough has become.

When exposed to a flux of 0.89 megawatts per square meter for 45 seconds to a beam moving at 200 millimeters per second, this distance was only 0.1 millimeters. At a higher power flux of 1.78 megawatts per square meter, the depth was 0.22 millimeters. Increasing supplied energy increases evaporation, browning, and heat penetration.

For a given power flux, the extent of heat penetration depends on beam diameter and exposure time. In general, at short exposure times, the beam diameter does not make a great deal of difference, whereas at longer exposure times, heat penetration is greatest with a wide beam diameter and least with a small beam diameter.

For example, at an exposure time of 40 seconds, an 8-watt laser caused heat to penetrate the sample to a depth of about 0.1 millimeters. This was true for a range of beam diameters from 1.1 millimeters to 5.7 millimeters. As exposure time increased, the spread in penetration depth increased until, at a 180-second exposure, the spread between the heat penetration caused by the 1.1-millimeter beam and that caused by the 5.7-millimeter beam was about 0.55 millimeters. It is apparent that there is a trade-off between weight loss and penetration. A wide beam yields low weight loss and high penetration and a narrow beam yields the converse. An increase in penetration depth tends to slow the rate of temperature increase in the sample and thus reduce evaporation.

In a three-dimensional space in which the axes represent penetration depth, weight-loss, and exposure time, it is possible to use linear regression on collected data for a particular sample to define a plane that relates these three parameters. In one example, the plane is defined by $H = 0.00441 t - 0.75003 D - 0.01932$, where H represents heat penetration in millimeters, D represents weight loss in grams, and T represents exposure time in seconds.

When baking dough, it is important that starch gelatinization occur. Otherwise the dough will not transform into crumb. Gelatinization occurs only when the temperature within the dough surpasses a threshold temperature. At 70° C., starch begins to swell. By 95° C., full gelatinization will have taken place.

In the baking method described herein, light from an energy source impinges on the surface of the dough. Because heat transfer due to conduction takes some time, the temperature is highest at the surface and decreases as one moves below the surface into the bulk. In one experiment, exposing a dough sample to a 5.7-millimeter beam from an 8-watt laser for 180 seconds resulted in a temperature of about 77° C. at a depth of about 0.25 millimeters. At 1 millimeter below the surface, the temperature had dropped to about 70° C., and at 2 millimeters below the surface, the temperature had fallen all the way to 58° C., too low for even an initial swelling of starch. It is therefore apparent that although the infrared laser is able to brown effectively, its baking ability is limited to very thin samples of dough.

An unexpected advantage of laser baking arises from the absence of pillow expansion. When a flat piece of dough is baked in a conventional oven, it tends to deform into a pillow shape. The result is a baked product that is no longer flat. Additionally, the dough will tend to brown only near the center, where the pillow is thickest. This is undesirable for layered food manufacturing, in which the baked layers are expected to remain flat.

Laser baking as described herein provides a way to avoid the tendency of dough to form pillows in a conventional oven and to fully bake flat sheets of dough.

An additional disadvantage of baking thin sheets of dough in the oven is that the interior tends to complete baking long before the surface has browned. The laser baking method as described herein avoids this difficulty because energy delivered by a laser diffuses slowly enough into the dough and the laser browns swiftly enough so that a suitably browned baked good can be produced with a thin piece of dough.

Although the infrared laser is able to transform some dough into crumb, the quality of the crumb is not entirely satisfactory. There is, in fact, a distinct difference in texture between oven-baked crumb and crumb baked by an infrared laser, the latter being much more closely packed than the former. It is to achieve a better crumb that the shorter wavelength laser is used.

The short and long wavelength lasers thus cooperate so that the former is able to bake the interior of the dough and the latter is able to brown the exterior.

Because a laser applies radiative energy at the surface and relies on conduction for cooking, it also lends itself to broiling of animal flesh, whether it be meat or fish. It is particularly advantageous if the flesh can be cut thinly. A selective broiling system that relies on a guided laser as shown in FIG. 1 can be used to denature protein in thinly sliced meats.

In one experiment, frozen salmon was sliced in a direction perpendicular to the skin to form salmon planes and inserted into the apparatus shown in FIG. 1 for broiling. However, the infrared laser was replaced with another short-wavelength laser. The first laser 34 was a 5-watt short-wavelength laser and the second laser 36 was a 2-watt short-wavelength laser having a more collimated beam. Both the first and second lasers 34, 36 provided light at 445 nanometers.

The lasers 34, 36 were scanned across the salmon plane using a trochoidal illumination pattern similar to the sixth pattern 62 shown in FIG. 3. The space between adjacent circles defines a circle density of the trochoid.

This creates a form of pulsatile heating. If energy flux at a particular point in the salmon plane is plotted as a function of time, the result will be the product of an envelope function and a pulse train. Each pulse in the pulse train corresponding to the passage of a circle from the trochoidal pattern over that point. The envelope function is a bimodal function in which the first and second modes correspond to times during which the portion of the trochoidal pattern with highest circle density passes over the point.

With this in mind, it is apparent that the respite from illumination during the two modes of the envelope function can be extended by choosing a larger circle diameter.

The modes themselves are roughly gaussian in shape. It is possible to control the variance of a mode by changing the beam's diameter, with a smaller diameter tending to increase variance. However, using the beam diameter to manipulate variance will also vary beam flux. For example, an attempt to increase variance by reducing the beam diameter will also have the effect of increasing flux through the beam. To increase the variance without changing beam flux, it is possible to decrease circle density.

Decreasing speed affects neither variance nor maximum heat delivered. However, a lower speed will increase the delay between individual pulses in the pulse train.

Pulsatile heating is particularly advantageous when using lasers for broiling because the energy flux is quite high. Thus, there should be a resting interval to allow heat to dissipate. This permits the heating profile to more closely approximate that of a conventional broiler.

A higher power-flux will tend to cause more pronounced peaks during the pulse heating process. Thus, when carrying out pulsatile heating, it is useful to provide a laser that does not have an excessively-high power flux. This will tend to avoid burning and enlarge the heat-affected zone, thus contributing to superior broiling.

An important parameter in broiling is the extent of heat penetration. Since radiative energy impinges on the salmon plane from above, the heat that flows inward flows via conduction. It is important heat flow inward to cook the salmon before the radiative energy impinging on the salmon plane can burn its surface.

It is possible to exercise control over broiling by controlling the circle diameter, circle density, and repetition of the pattern.

In general, increasing circle diameter will decrease the energy delivered per unit area but not the energy per unit of travel distance. Increasing circle diameter also increases the apparent speed of the moving laser since there will be a larger step size between points along the path followed by the interlaced circles. Thus, heat penetration tends to decrease with increasing circle diameter. Thus, the larger the circle diameter that is used the thinner the salmon plane should be to permit adequate cooking without burning the surface. Increasing circle density and repeating the pattern also increase the extent of heat penetration. The depth of heat penetration is also directly proportional to the period of the interlaced pattern.

Although particular embodiments have been disclosed herein in detail, this has been done by way of example for purposes of illustration only and is not intended to be limiting with respect to the scope of the appended claims, which follow. Some other aspects, advantages, and modifications are considered to be within the scope of the claims provided below. The claims presented are representative of at least some of the embodiments and features disclosed herein. Other unclaimed embodiments and features are also contemplated.

All implementations described herein are non-abstract implementations in which non-abstract lasers are used to non-abstractly cook non-abstract food products. The claims set forth herein cover only non-abstract subject matter. Applicant, acting as his own lexicographer, hereby defines non-abstract subject matter to be subject matter that is patentable under 35 USC 101 as of the filing date of this application.

Although particular embodiments have been disclosed herein in detail, this has been done by way of example for purposes of illustration only and is not intended to be limiting with respect to the scope of the appended claims, which follow. Features of the disclosed embodiments can be combined, rearranged, etc., within the scope of the invention to produce more embodiments. Some other aspects, advantages, and modifications are considered to be within the scope of the claims provided below. The claims presented are representative of at least some of the embodiments and features disclosed herein. Other unclaimed embodiments and features are also contemplated.

The invention claimed is:

1. A method comprising providing an edible substance, causing a first laser beam to trace out a first pattern on a surface of said edible substance, causing a second laser beam to trace out a second pattern on said food substance, wherein said first laser beam is in the visible range and said second laser beam is in the infrared range, and wherein said second pattern is dependent on said first pattern.

2. The method of claim 1, further comprising causing said first and second laser beams to continue tracing out said first pattern and second pattern until said edible substance has been transformed to a cooked food substance.

3. The method of claim 1, further comprising printing an edible structure, wherein said edible substance is a constituent of said edible structure, wherein the printing comprises causing a printer to output an edible substance from a nozzle thereof to form said edible structure, said method further comprising cooking at least a portion of said edible structure.

4. The method of claim 1, wherein providing an edible substance comprises providing first layer and a second layer, each of the first layer and the second layer comprising an edible substance, wherein said surface comprises a surface of said first layer, said method further comprising causing said first laser beam to deposit energy on a surface of said second layer, causing a second laser beam to deposit energy on said second layer, and manufacturing a food product that comprises at least said first and second layers.

5. The method of claim 1, wherein said edible substance comprises a surface and a core, wherein causing said first laser beam to trace out said first pattern comprises causing said first laser to cook said core, and wherein causing said second laser beam to trace out said second pattern on said food substance comprises causing said second laser to brown at least a portion of said surface.

6. The method of claim 1, wherein said at least one of said first pattern and said scan pattern comprises circles, said method further comprising modulating cooking of the edible substance by controlling at least one of circle diameter, circle density, and laser speed.

7. The method of claim 1, further comprising modulating cooking of the edible substance by controlling repetition of one of said first pattern and said second pattern.

* * * * *